US010454542B2

(12) United States Patent
Wang et al.

(10) Patent No.: US 10,454,542 B2
(45) Date of Patent: Oct. 22, 2019

(54) UPLINK MIMO DESIGN (71) Applicant: QUALCOMM Incorporated, San Diego, CA (US)

(72) Inventors: Renqiu Wang, San Diego, CA (US); Wei Zeng, San Diego, CA (US); Xiaoxia Zhang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/660,325

(22) Filed: Jul. 26, 2017

(65) Prior Publication Data

US 2018/0131418 A1 May 10, 2018

Related U.S. Application Data (60) Provisional application No. 62/418,171, filed on Nov. 4, 2016.

(51) Int. Cl.
*H04B 7/0456* (2017.01)
*H04B 7/0417* (2017.01)
(Continued)

(52) U.S. Cl.
CPC ......... *H04B 7/0456* (2013.01); *H04B 7/0417* (2013.01); *H04B 7/0452* (2013.01);
(Continued)

(58) Field of Classification Search
CPC .. H04B 7/0456; H04B 7/0417; H04B 7/0452; H04B 7/0617; H04L 27/2601; H04W 88/02
See application file for complete search history.

(56) References Cited

U.S. PATENT DOCUMENTS

2007/0160156 A1* 7/2007 Melzer ................ H04B 7/0417
375/260
2009/0023451 A1* 1/2009 Pan ...................... H04B 7/0452
455/446
(Continued)

FOREIGN PATENT DOCUMENTS

EP          2498413 A1     9/2012

OTHER PUBLICATIONS

International Search Report and Written Opinion—PCT/US2017/055374—ISA/EPO—dated Jan. 9, 2018.

*Primary Examiner* — Freshteh N Aghdam
(74) *Attorney, Agent, or Firm* — Harrity & Harrity, LLP (57) ABSTRACT

Aspects of the disclosure relate to multiple-input multiple-output (MIMO) signals, and the determination of a precoding matrix for configuring the MIMO signals. An uplink traffic channel may be configured utilizing orthogonal frequency division multiplexing (OFDM) waveform. Determination of the precoding matrix may be based at least in part on an estimate of the uplink carrier, where the uplink carrier estimate is based at least in part on a downlink reference signal, exploiting channel reciprocity in a time division duplex (TDD) carrier. Determination of the precoding matrix may further be based at least in part on a cross-correlation matrix Rnn or a whitening matrix determined by a scheduling entity. Other aspects, embodiments, and features are also claimed and described.

30 Claims, 7 Drawing Sheets

(51) Int. Cl.
*H04B 7/0452* (2017.01)
*H04L 27/26* (2006.01)
*H04W 88/02* (2009.01)
*H04B 7/06* (2006.01)

(52) U.S. Cl.
CPC ........ *H04B 7/0617* (2013.01); *H04L 27/2601* (2013.01); *H04W 88/02* (2013.01)

(56) References Cited

U.S. PATENT DOCUMENTS

| | | | |
|---|---|---|---|
| 2009/0207822 A1* | 8/2009 | Kim | H04B 7/026 370/338 |
| 2009/0262719 A1* | 10/2009 | Shim | H04B 7/0452 370/342 |
| 2011/0090882 A1* | 4/2011 | Lee | H04L 25/0228 370/338 |
| 2013/0089159 A1* | 4/2013 | Liu | H04B 7/024 375/267 |
| 2013/0136159 A1* | 5/2013 | Goldsmith | H04B 7/024 375/219 |
| 2014/0307645 A1* | 10/2014 | Ji | H04L 1/0003 370/329 |
| 2017/0244513 A1* | 8/2017 | Pitakdumrongkija | H04B 7/0452 |

* cited by examiner

UPLINK MIMO DESIGN

CROSS-REFERENCE TO RELATED APPLICATIONS UNDER 35 U.S.C. § 119

This application claims priority to Provisional Patent Application No. 62/418,171, filed on Nov. 4, 2016, entitled "UPLINK MIMO DESIGN," which is hereby expressly incorporated by reference herein.

TECHNICAL FIELD

The technology discussed below relates generally to wireless communication systems, and more particularly, to uplink MIMO transmissions utilizing an OFDM waveform. Embodiments can provide and enable techniques for determining a precoding matrix for the uplink MIMO transmission, and signaling the precoding matrix between entities in a radio access network.

INTRODUCTION

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to multiple-input multiple-output (MIMO) signals, and the determination of a precoding matrix for configuring the MIMO signals.

In some aspects, a method of wireless communication may include determining, by a user equipment (UE), an uplink channel estimate based at least in part on a downlink reference signal; receiving, by the UE, an indication of a cross-correlation matrix or a whitening matrix from a base station; and determining, by the UE, a precoding matrix for an uplink multiple-input multiple-output (MIMO) signal based at least in part on the uplink channel estimate and at least one of the cross-correlation matrix or the whitening matrix.

In some aspects, a method of wireless communication may include transmitting, by a base station, a downlink reference signal to a UE; transmitting, by the base station, an indication of a cross-correlation matrix or a whitening matrix to the UE; and receiving, by the base station, an uplink MIMO signal from the UE, wherein the uplink MIMO signal is precoded using a precoding matrix determined based at least in part on the downlink reference signal and at least one of the cross-correlation matrix or the whitening matrix.

In some aspects, a method of wireless communication may include receiving, by a base station, a reference signal from a UE; determining, by the base station, an indication corresponding to an estimate of a cross-correlation matrix or a whitening matrix based at least in part on the reference signal; and determining, by the base station, a precoding matrix for an uplink MIMO signal based at least in part on the reference signal and at least one of the cross-correlation matrix or the whitening matrix.

In some aspects, a method of wireless communication may include transmitting, by a UE, a reference signal to a base station; receiving, by the UE, information relating to a precoding matrix for an uplink MIMO signal to be transmitted by the UE, wherein the precoding matrix is determined based at least in part on the reference signal; and transmitting, by the UE, the uplink MIMO signal, wherein the uplink MIMO signal is precoded using the precoding matrix.

These and other aspects will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Radio Access Network

Figure 1:
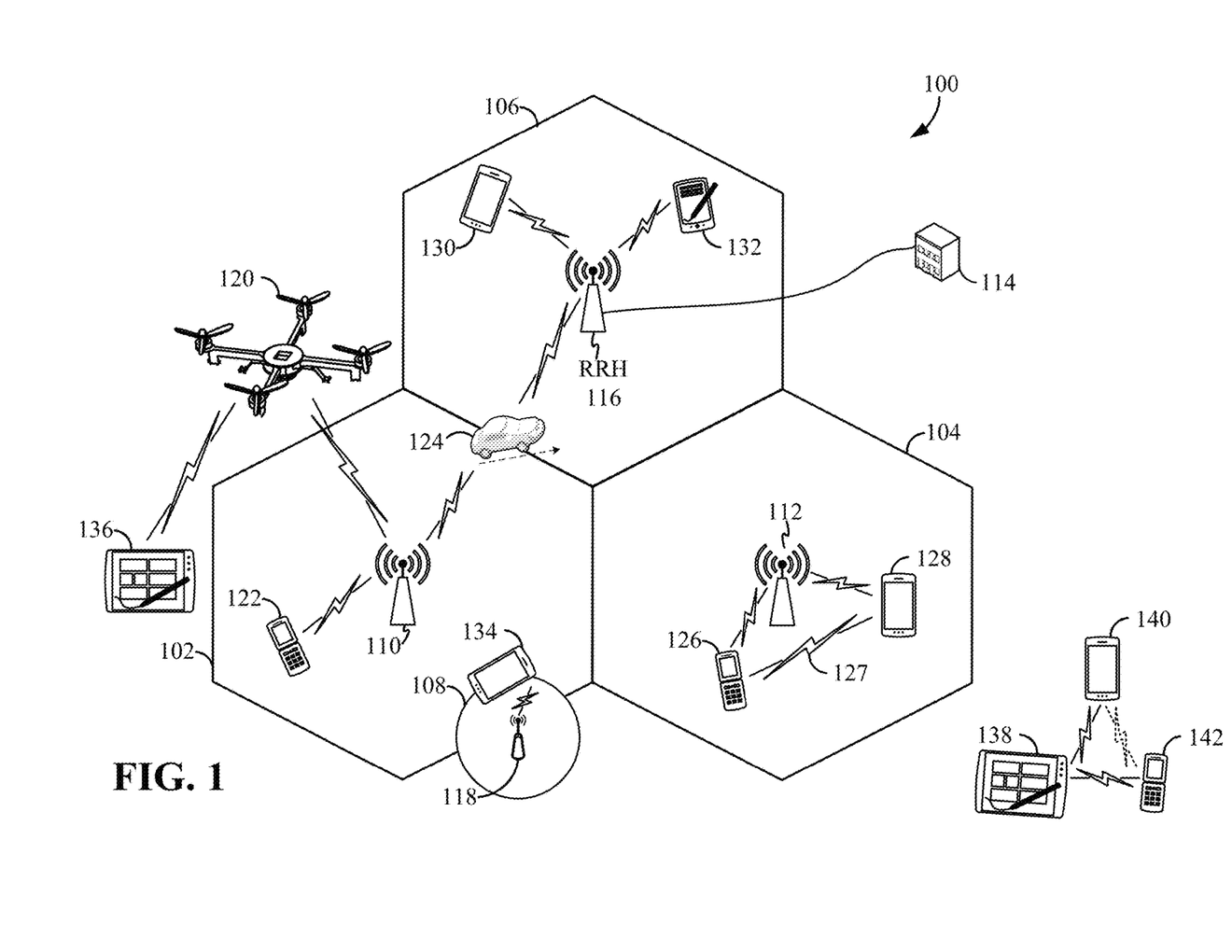
FIG. 1 is a conceptual diagram illustrating an example of a radio access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) using an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be transmitted in transmission time intervals (TTIs). As used herein, the term TTI may refer to the inter-arrival time of a given schedulable set of data. In various examples, a TTI may be configured to carry one or more transport blocks, which are generally the basic data unit exchanged between the physical layer (PHY) and medium access control (MAC) layer (sometimes referred to as a MAC PDU, or protocol data unit). In accordance with various aspects of the present disclosure, a subframe may include one or more TTIs. Thus, as further used herein, the term subframe may refer to an encapsulated set of information including one or more TTIs, which is capable of being independently decoded. Multiple subframes may be grouped together to form a single frame or radio frame. Any suitable number of subframes may occupy a frame. In addition, a subframe may have any suitable duration (e.g., 250 µs, 500 µs, 1 ms, etc.).

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Signaling Entities

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
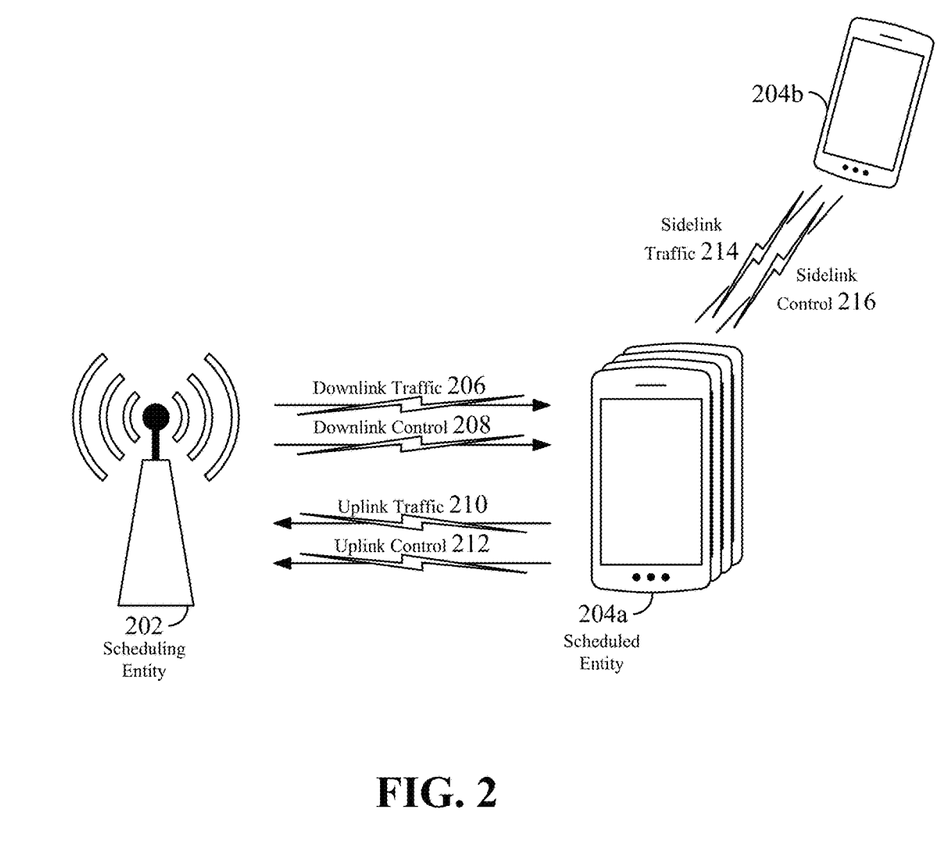
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic information 214.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
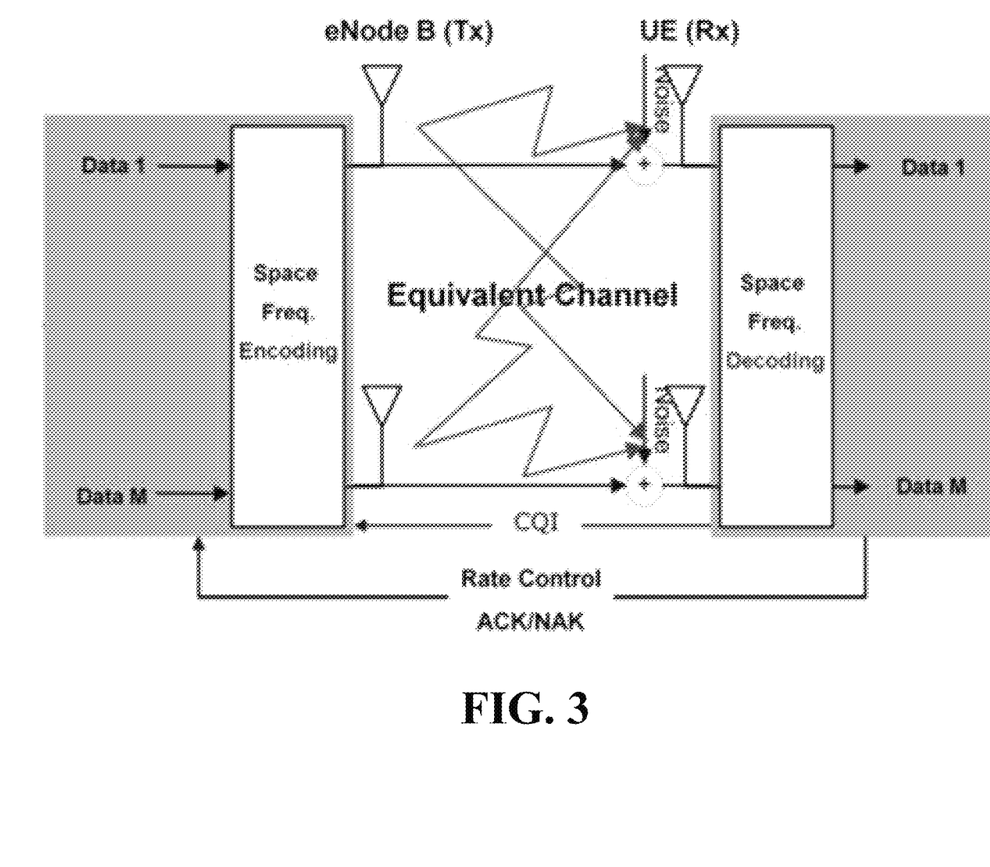
FIG. 3 is a schematic diagram illustrating multiple-input multiple-output (MIMO) communication over a wireless channel.
Figure 4:
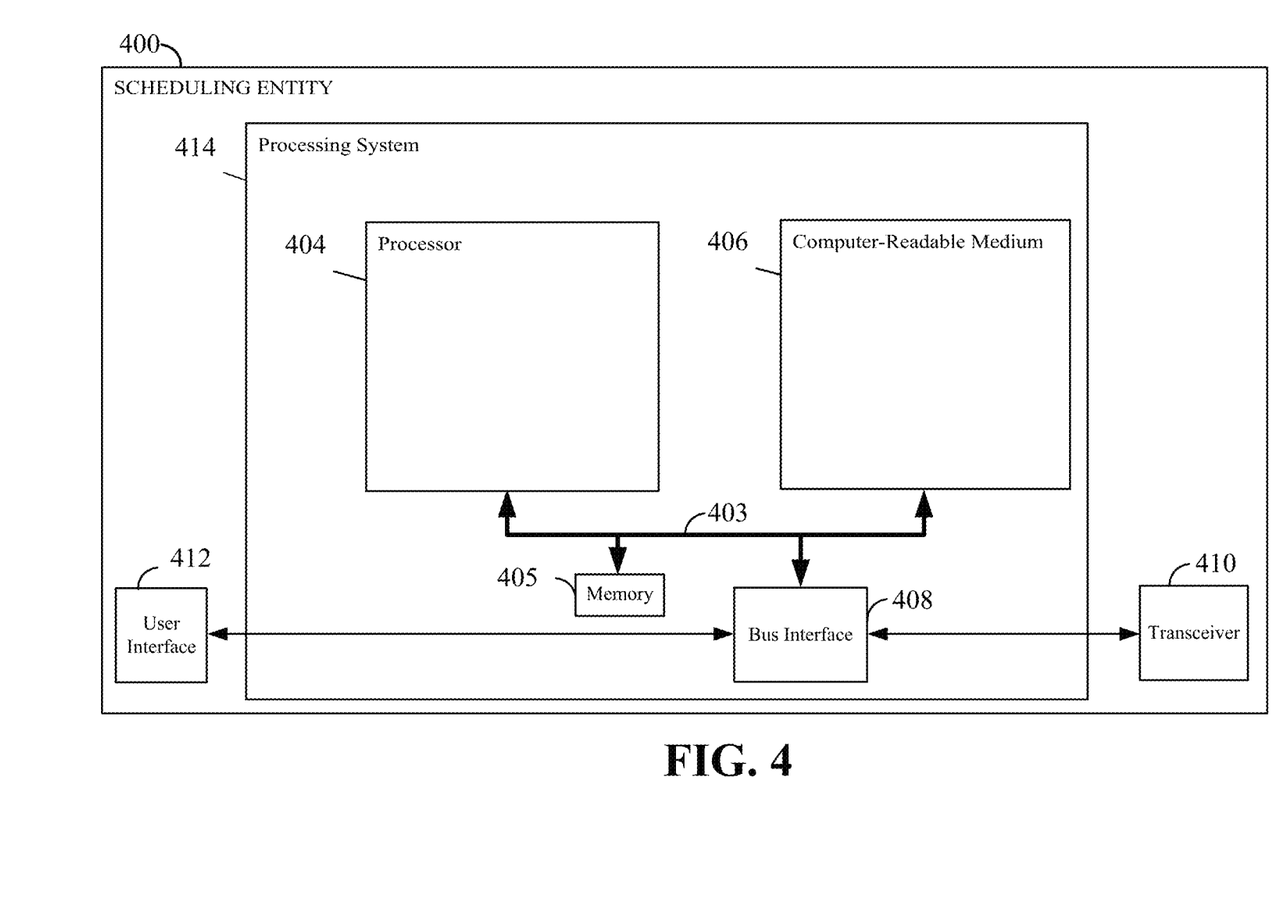
FIG. 4 is a block diagram illustrating an example of a hardware implementation for a scheduling entity employing a processing system.

FIG. 3 is a schematic diagram illustrating MIMO communication over a wireless channel between a scheduling entity and a scheduled entity.
Scheduling Entity FIG. 4 is a block diagram illustrating an example of a hardware implementation for a scheduling entity 400 employing a processing system 414. For example, the scheduling entity 400 may be a user equipment (UE) as illustrated in any one or more of FIGS. 1, 2, and/or 3. In another example, the scheduling entity 400 may be a base station as illustrated in any one or more of FIGS. 1, 2, and/or 3.

The scheduling entity 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 400 may be configured to perform any one or more of the functions described herein. That is, the processor 404, as utilized in a scheduling entity 400, may be used to implement any one or more of the processes and procedures described below and illustrated in FIG. 6.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Scheduled Entity

Figure 5:
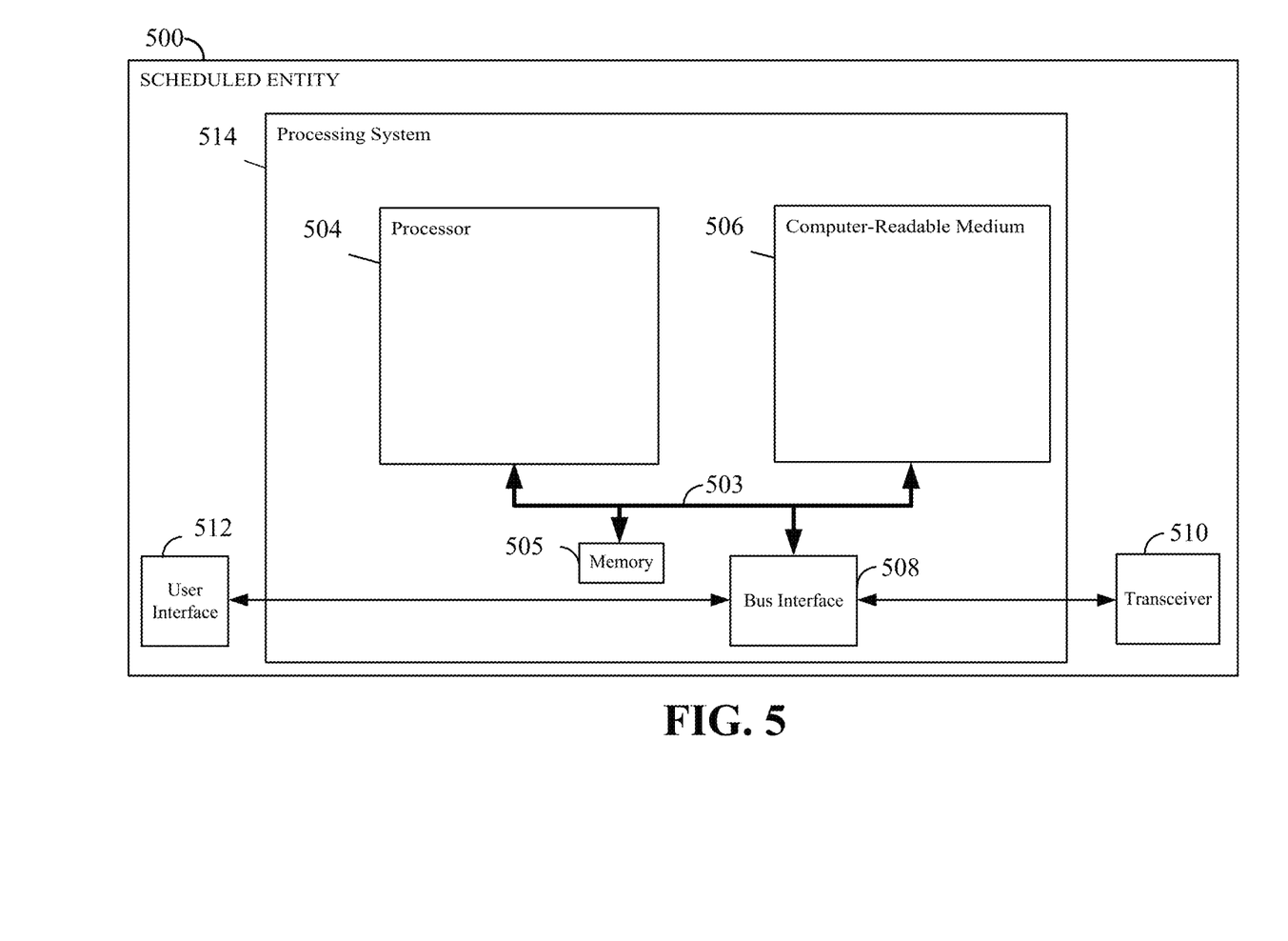
FIG. 5 is a block diagram illustrating an example of a hardware implementation for a scheduled entity employing a processing system.

FIG. 5 is a conceptual diagram illustrating an example of a hardware implementation for an exemplary scheduled entity 500 employing a processing system 514. In accordance with various aspects of the disclosure, an element, or any portion of an element, or any combination of elements may be implemented with a processing system 514 that includes one or more processors 504. For example, the scheduled entity 500 may be a user equipment (UE) as illustrated in any one or more of FIGS. 1, 2, and/or 3.

The processing system 514 may be substantially the same as the processing system 414 illustrated in FIG. 4, including a bus interface 508, a bus 502, memory 505, a processor 504, and a computer-readable medium 506. Furthermore, the scheduled entity 500 may include a user interface 512 and a transceiver 510 substantially similar to those described above in FIG. 3. That is, the processor 504, as utilized in a scheduled entity 500, may be used to implement any one or more of the processes described below and illustrated in FIG. 7.

Aspects of the present disclosure may be applied in a variety of radio access technologies (RATs). A RAT refers to the type of technology or communication standard utilized for radio access and communication over a wireless air interface. Just a few examples of RATs include GSM, UTRA, E-UTRA (LTE), Bluetooth, and Wi-Fi. In particular, one RAT is a 5G new radio (NR) RAT. NR generally refers to 5G technologies and the new radio access technology undergoing definition and standardization by 3GPP in Release 15.

In an LTE network, eNBs use OFDM for downlink transmissions, while UEs use SC-FDMA for uplink transmissions. With OFDM, or orthogonal frequency division multiplexing, an air interface may be defined according to a two-dimensional grid of resource elements with a separation of resources in frequency using a set of closely spaced frequency tones or sub-carriers, and separation in time using a sequence of symbols having a given duration. By setting the spacing between the tones based at least in part on the symbol rate, inter-symbol interference can be reduced or eliminated. OFDM channels provide for high data rates by allocating a data stream in a parallel manner across multiple subcarriers.

SC-FDMA, or single carrier frequency division multiple access (also referred to as discrete Fourier transform spread OFDMA (DFTS-OFDMA)) is similar to OFDM, but includes an additional DFT processing step. SC-FDMA can provide a lower peak to average power ratio (PAPR) than OFDM.

In either the uplink or the downlink directions, LTE networks may further support MIMO. MIMO (multiple-input multiple-output) is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based at least in part on known channel state information). At the multi-antenna receiver, the different spatial signatures of the respective streams (and, in some examples, known channel state information) can enable the separation of these streams from one another. In single-user MIMO, the transmitter sends one or more streams to the same receiver, taking advantage of capacity gains associated with using multiple Tx, Rx antennas in rich scattering environments where channel variations can be tracked. The receiver may track these channel variations and provide corresponding feedback to the transmitter. This feedback may include channel quality information (CQI), the number of preferred data streams (e.g., rate control, a rank indicator (RI)), and a precoding matrix index (PMI).

Some extensions on MIMO include massive MIMO and multi-user MIMO (MU-MIMO). Massive MIMO is generally a MIMO system with a very large number of antennas (e.g., greater than an 8×8 array). MU-MIMO refers to a multi-antenna technology where a base station, in communication with a large number of UEs, can exploit multipath signal propagation to increase overall network capacity by increasing throughput and spectral efficiency, and reducing the required transmission energy. In further detail, the transmitter (e.g., base station or eNB) may attempt to increase the capacity by transmitting to multiple users using its multiple transmit antennas at the same time, and also using the same allocated time-frequency resources. The receiver may transmit feedback including a quantized version of the channel so that the transmitter can schedule the receivers with good channel separation. The transmitted data is precoded to maximize throughput for users and minimize inter-user interference.

In the downlink direction, LTE networks provide for ten transmission modes TM1-TM10, and up to eight layers for MIMO. Here, based at least in part on downlink reference signal (RS) transmissions, the UE may estimate a cross-correlation matrix Rnn, and based at least in part on this estimate, may transmit feedback such as a selected PMI. In some examples, to account for frequency selectivity, a different PMI may be determined and selected for each of a plurality of resource blocks (RB). However, the eNB may generally override the UE's PMI selection. If the eNB does not adopt the UE's proposed PMI, in some examples, the eNB may transmit to the UE the PMI used to override the UE's selection. However, in some examples, the eNB may not transmit the override PMI. That is, it is possible for the eNB to precode a reference signal (RS) transmission such as the demodulation reference signal (DMRS) utilizing the override PMI. Along with the DMRS transmission, the eNB may transmit downlink traffic utilizing the same PMI. Here, it is not required for the UE to be explicitly given the PMI, because precoding the DMRS with the same PMI makes the precoding transparent. That is, the UE may estimate the channel based at least in part on the DMRS, and based at least in part on that estimate, the UE may demodulate the downlink MIMO transmission even without explicit knowledge of the PMI used.

In the uplink direction, LTE networks provide for up to four layers for MIMO, utilizing a separate DFT per layer. Each layer is then mapped to each antenna. Unlike with downlink MIMO, which uses OFDM, for uplink MIMO, which uses SC-FDMA, wideband precoding is used. That is, to ensure that a single carrier waveform is retained, wideband precoding is needed, even though the channel may vary across the spectrum due to frequency selectivity. Thus, even with a large bandwidth with several RBs, all uplink RBs may be precoded using the same precoding matrix. Further, in uplink transmissions, and also to retain a single-carrier waveform, each antenna corresponds only to one layer. For uplink MIMO in LTE, precoding is based at least in part on a limited codebook or table with a predetermined set of PMIs from which a UE may choose.

For future networks, including but not limited to a 5G new radio (NR) access network, there may be a need for 8-layer MIMO in the uplink direction to provide for higher data rates. Accordingly, there is a need in the field for system support for such high-dimensional MIMO transmissions.

Unlike in LTE, current discussions of 5G NR networks are directed to the use of DFTS-OFDMA only for single-layer transmissions. In the case of a multi-antenna device, such single-layer transmissions may still be utilized for beamforming and/or transmit diversity. In this case, wideband precoding may continue to be utilized, as in the LTE network design, to maintain a single-carrier waveform in uplink transmissions.

Beamforming refers to directional signal transmission or reception. For a beamformed transmission, the amplitude and phase of each antenna in an array of antennas may be precoded, or controlled to create a desired (i.e., directional) pattern of constructive and destructive interference in the wavefront.

However, 5G NR networks are expected to utilize CP-OFDM (cyclic-prefix OFDM) for uplink transmissions with a single layer or with multiple layers. Here, the uplink MIMO system design may leverage the downlink MIMO design, since both may utilize CP-OFDM waveforms.

For example, the same codebook may be utilized for selection of a precoding matrix for uplink MIMO and downlink MIMO transmissions.

Furthermore, the design of a DMRS sequence and pattern may be the same for uplink MIMO transmissions and downlink MIMO transmissions. Here, it is important to note that the DMRS sequence and pattern may be different for a base station and a UE in a particular RAN because the base station and the UE may have different numbers of antennas. However, according to an aspect of the disclosure, the general design of the DMRS sequence and pattern may still be re-used, such that the UE would utilize the DMRS sequence and pattern of a hypothetical base station that had the number of antennas that the UE actually has. That is, the same algorithm for determining the DMRS sequence and pattern that would have been used for a base station with N antennas may be re-used for determining the DMRS sequence and pattern for a UE with N antennas. Of course, the base station may be configured to be capable of transmitting a downlink MIMO transmission with a higher number of layers than a UE may be configured to be capable of transmitting with an uplink MIMO transmission. Still up to the UE's upper limit of its number of layers (e.g., 8 layers or any suitable upper limit), the DMRS sequence and pattern design may be re-used for UL transmissions.

As indicated above, the base station may have a different number of antennas than that of a UE in communication with that base station in a 5G NR RAN. As one nonlimiting example, a given UE may have 8 antennas, while a given base station may have 64 antennas. Accordingly, the precoding matrix utilized by the base station for downlink MIMO transmissions may differ from the precoding matrix utilized by that UE for uplink MIMO transmissions. Still, similar to the discussion above regarding the DMRS sequence and pattern design, the selection of a precoding matrix for uplink MIMO transmissions may follow the same algorithm as that for the selection of a precoding matrix for downlink MIMO transmissions from a hypothetical base station with the same number of antennas as the UE.

In a further aspect of the disclosure, a 5G NR network may differ from an LTE network, which utilizes wideband precoding across the entire uplink system bandwidth as discussed above. That is, in a 5G NR network, uplink transmissions may be based at least in part on a different precoder or precoding matrix for each resource block (RB) or for each sub-band or sub-carrier. In this way, precoder selection for uplink MIMO transmissions may be enabled to account for frequency selectivity in the uplink channel.

Figure 6:
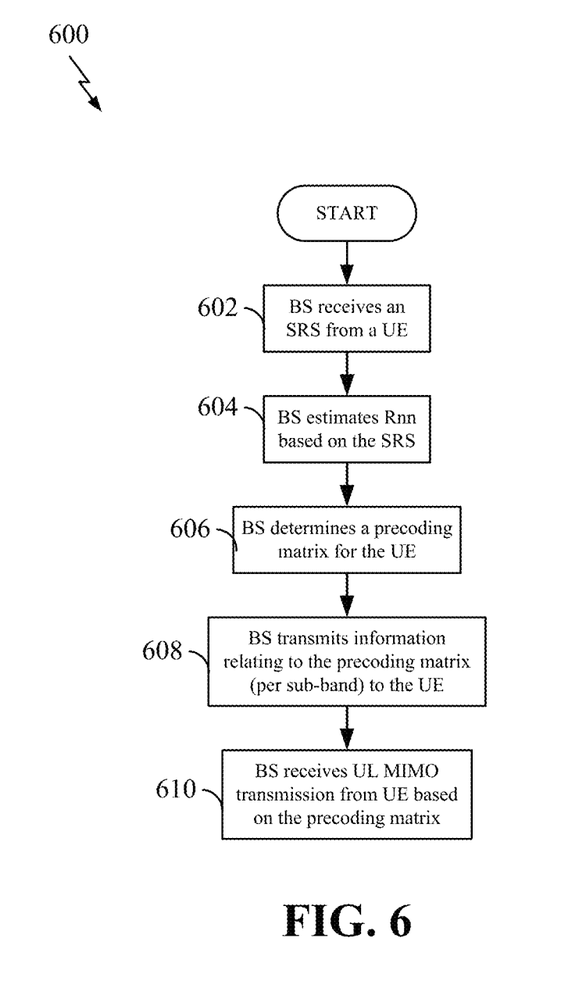
FIG. 6 is a flow chart illustrating an exemplary process for uplink MIMO transmission in accordance with some aspects of the present disclosure.

FIG. 6 is a flow chart illustrating an exemplary process 600 for uplink MIMO transmission in accordance with some aspects of the present disclosure. In the illustrated example of FIG. 6, a base station determines the precoding matrix for the UE to utilize for uplink MIMO transmissions. As described below, some or all illustrated features may be omitted in a particular implementation within the scope of the present disclosure, and some illustrated features may not be required for implementation of all embodiments. In some examples, the process 600 may be carried out by the scheduling entity 400 (e.g., a base station or eNB) illustrated in FIG. 4. In some examples, the process 600 may be carried out by any suitable apparatus or means for carrying out the functions or algorithm described below.

At block 602, a base station may receive a reference signal (e.g., a sounding reference signal or SRS) from a UE. Here, the SRS may be a wideband RS, enabling the base station to characterize the channel across the spectrum. At block 604, the base station may determine an indication corresponding to an estimate of a cross-correlation matrix (Rnn) between the UE and base station antennas based at least in part on the SRS. In another example, the base station may determine an indication corresponding to an estimate of a whitening matrix. The indication may include, for example, the estimated Rnn or whitening matrix, indexed and/or quantized values of the estimated Rnn or whitening matrix, an index corresponding to the estimated Rnn or whitening matrix, and/or the like. For example, the UE may select an index from a list of indices corresponding to a list of possible matrices (e.g., estimated cross-correlation matrices and/or whitening matrices), and may transmit the index to the base station. In some aspects, the index may be determined based at least in part on a codebook. Additionally, or alternatively, the UE may index and/or quantize the values included in the estimated cross-correlation matrix and/or whitening matrix, and may transmit the indexed and/or quantized values to the base station. In this way, network resources may be conserved.

At block 606, the base station may determine a precoding matrix for the UE to utilize for an uplink MIMO transmission based at least in part on the estimated Rnn or whitening matrix.

At block 608, the base station may transmit information relating to the precoding matrix (which may include a plurality of precoding matrices, e.g., one precoding matrix per sub-band) to the UE. In various aspects of the disclosure, as discussed further below, this information may be explicitly or implicitly signaled to the UE.

At block 610, the base station may receive an uplink MIMO transmission from the UE based at least in part on the precoding matrix.

In this example, because the base station determines the precoding matrix for the UE, the network retains control over each UE's precoder selection. However, because the precoding matrix (e.g., for each sub-band) may be signaled to the UE, this example may result in a large amount of signaling overhead.

Figure 7:
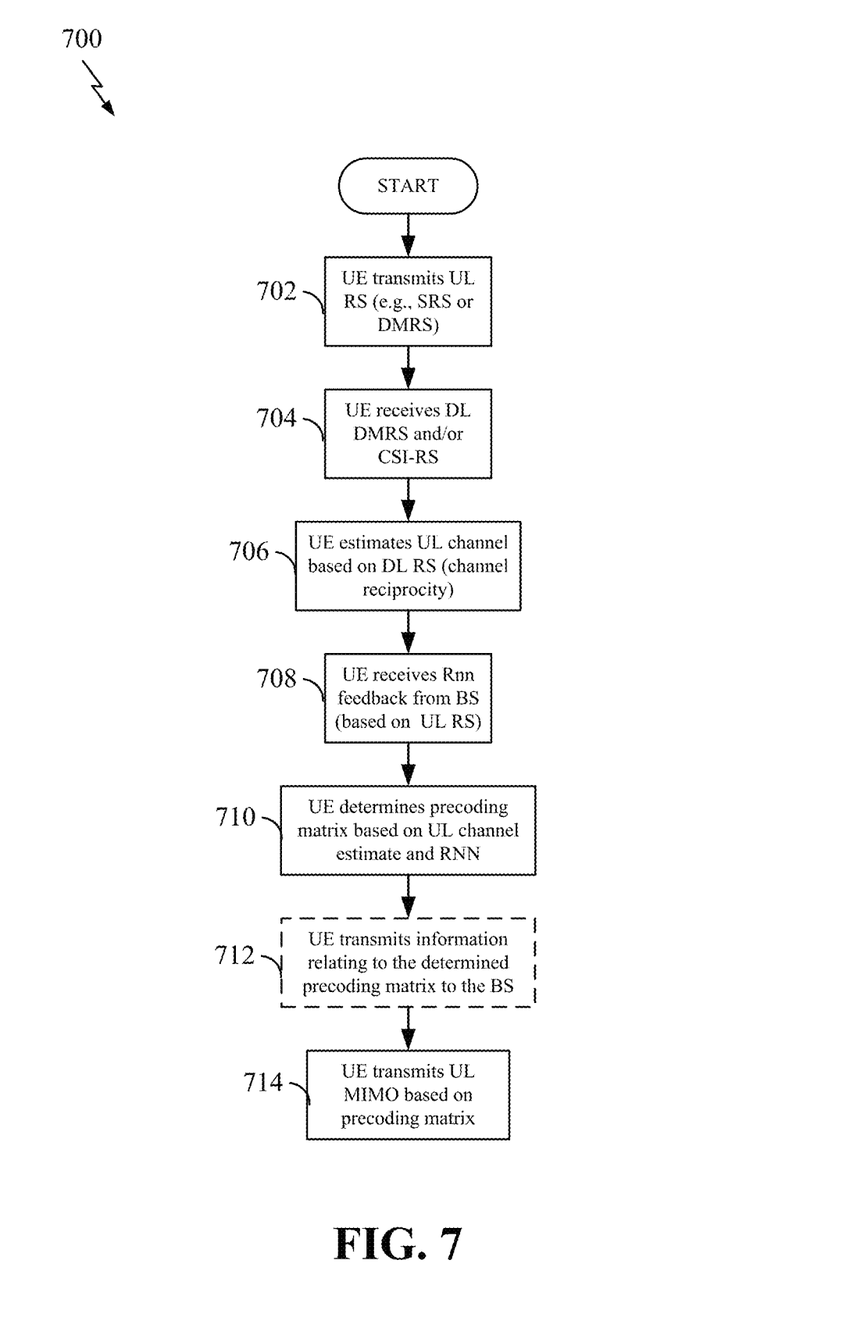
FIG. 7 is a flow chart illustrating an exemplary process for uplink MIMO transmission in accordance with some aspects of the present disclosure.

FIG. 7 is a flow chart illustrating an exemplary process 700 for uplink MIMO transmission in accordance with another aspect of the present disclosure. In the illustrated example of FIG. 7, a UE determines its own precoding matrix for uplink MIMO transmissions. As described below, some or all illustrated features may be omitted in a particular implementation within the scope of the present disclosure, and some illustrated features may not be required for implementation of all embodiments. In some examples, the process 700 may be carried out by the scheduled entity 500 illustrated in FIG. 5. In some examples, the process 700 may be carried out by any suitable apparatus or means for carrying out the functions or algorithm described below.

At block 702, a UE may transmit an uplink reference signal (e.g., an SRS and/or DMRS), and at block 704, the UE may receive a downlink reference signal (e.g., a DMRS and/or CSI-RS). Here, a CSI-RS is a channel state information reference signal that may be configured to be utilized by the UE to estimate the channel for the purpose of sending channel quality information (CQI) back to the base station.

At block 706, the UE may determine an estimate of the uplink channel based at least in part on the RS received at block 704. That is, current discussions of 5G NR networks are concentrating on the usage of unpaired carriers, utilizing TDD. Accordingly, unlike with paired FDD carriers, the same channel, having the same channel characteristics, exists for communications in both directions (uplink and downlink). This is frequently referred to as channel reciprocity. Accordingly, when the UE receives the downlink RS transmitted by the base station at block 704 and determines a downlink channel estimate, this channel estimate may equivalently be considered an uplink channel estimate. (Of course, any channel is time-varying to some extent, which may reduce the precise nature of this equivalence; however, the rate of such variations may be large relative to the uplink/downlink switching rate in a typical 5G NR network utilizing TDD.)

At block 708, the UE may receive an indication of a cross-correlation matrix (Rnn) or whitening matrix from the base station based at least in part on the uplink RS transmitted by the UE at block 702.

Accordingly, at block 710, based at least in part on its uplink channel estimate and the indication of the Rnn or whitening matrix received from the base station, the UE may determine a precoding matrix for an uplink MIMO transmission. The indication may include, for example, the actual Rnn or whitening matrix, indexed and/or quantized values of the Rnn or whitening matrix, an index corresponding to the Rim or whitening matrix, and/or the like. Additional details are described below.

At optional block 712 (discussed further below), the UE may transmit information relating to the precoding matrix (which may include a plurality of precoding matrices, e.g., one precoding matrix per sub-band) to the base station. In various aspects of the disclosure, as discussed further below, this information may be explicitly or implicitly signaled to the base station.

At block 714, the UE may transmit its uplink MIMO signal based at least in part on the determined precoding matrix.

In this example, because the UE determines the precoding matrix, signaling overhead may be reduced because the UE may be capable of omitting transmission of the precoding matrix to the base station. That is, in some examples, the UE may precode its DMRS transmissions utilizing the same precoding matrix as it utilizes for traffic. Accordingly, the precoding matrix may be transparent. That is, the base station may estimate the channel based at least in part on the DMRS, and based at least in part on that estimate, the base station may demodulate the uplink MIMO transmission without explicit knowledge of the precoding matrix used.

However, because the UE determines the precoding matrix, a precoder algorithm may need to be defined or specified according to an industry standard. In this example, the base station may not be capable of adjusting or otherwise controlling the algorithm used by the UE to select its precoding matrix for uplink MIMO transmissions. Furthermore, in the case of a base station having a large number of antennas, the amount of signaling overhead required for its transmission of Rnn or whitening matrix feedback (see block 708 above) may be very large.

However, the conditions that lead to variations in the cross-correlation matrix Rnn or whitening matrix may change very slowly over time. Accordingly, in one aspect of the disclosure, in an example where the UE determines the precoding matrix for uplink MIMO transmissions, base station transmissions of Rnn or whitening matrix feedback may be very infrequent. As one example, updates of the Rnn or whitening matrix may be transmitted from the base station to the UE once per hour. In this way, the amount of signaling overhead required for transmission of Rnn or whitening matrix feedback (see block 708 above) may be reduced.

Additionally, or alternatively, the base station may transmit an indication of the Rnn or whitening matrix (e.g., as Rnn or whitening matrix feedback). The indication may include, for example, an actual matrix, indexed and/or quantized values of the matrix, an index corresponding to the matrix, and/or the like. For example, the base station may select an index from a list of indices corresponding to a list of possible matrices (e.g., cross-correlation matrices and/or whitening matrices), and may transmit the index to the UE. In some aspects, the index may be determined based at least in part on a codebook. Additionally, or alternatively, the base station may index and/or quantize the values included in the cross-correlation matrix and/or the whitening matrix, and may transmit the indexed and/or quantized values to the UE. In this way, network resources may be conserved.

As discussed above, when the base station determines the precoding matrix for uplink MIMO transmissions, the base station may generally need to let the UE know what precoding matrix to use. With reference to FIG. 6 block 608, the base station may transmit suitable information relating to the precoding matrix (e.g., a pre-coding matrix per sub-band) to the UE. As described further below, the base station may send the precoding matrix information to the UE utilizing explicit signaling or implicit signaling.

For example, the base station may transmit an explicit indication of the precoding matrix on a control channel. As one specific example, the base station may transmit a precoding matrix index (PMI) to a UE on a physical downlink control channel (PDCCH).

In another example, the base station may implicitly signal the precoding matrix to the UE without such an explicit transmission of the PMI on the PDCCH. For example, the base station may transmit one or more precoded reference signals together with one or more un-precoded reference signals. As one specific example, the base station may apply its selected precoding matrix for uplink MIMO transmissions to a downlink transmission of a DMRS and/or CSI-RS. The base station may transmit this precoded reference signal along with an un-precoded version of the DMRS and/or CSI-RS. In this way, the UE may cross-check the precoded and un-precoded RS transmissions against one another and may accordingly derive the precoding matrix.

In some examples, the base station may transmit a corresponding precoded and un-precoded RS in each sub-band, such that the UE may determine the corresponding precoding matrix per each sub-band.

In a further aspect of the disclosure, when the UE determines the precoding matrix for uplink MIMO transmissions, the UE may generally need to let the base station know what precoding matrix to use. With reference to FIG. 7 block 712, the UE may transmit suitable information relating to the precoding matrix (e.g., a pre-coding matrix per sub-band) to the base station. (On the other hand, as described above, the UE may omit such a transmission of the precoding matrix by precoding an uplink RS transmission to make the precoding transparent.) As described further below, the UE may send the precoding matrix information to the base station utilizing explicit signaling or implicit signaling.

For example, the UE may transmit an explicit indication of the precoding matrix on a control channel and/or a traffic channel. As one specific example, the UE may transmit a precoding matrix index (PMI) to a base station on a physical uplink control channel (PUCCH). Here, the PUCCH may be configured to carry control information such as channel quality information (CQI) feedback and a PMI (e.g., a suggested PMI) for downlink MIMO on the PUCCH. In an aspect of the present disclosure, the PUCCH may be configured to carry the additional payload of the uplink PMI along with the CQI feedback and downlink PMI.

In another specific example, the UE may transmit a precoding matrix index (PMI) to a base station on a physical uplink shared channel (PUSCH). In this example, the PUSCH, or at least the PMI within the PUSCH, may be transmitted either with or without precoding.

In another example, the UE may implicitly signal the precoding matrix to the base station without such an explicit transmission of the PMI on the PUCCH or PUSCH. For example, the UE may transmit one or more precoded reference signals together with one or more un-precoded reference signals. As one specific example, the UE may apply its selected precoding matrix for uplink MIMO transmissions to an uplink transmission of a DMRS and/or SRS. The UE may transmit this precoded reference signal along with an un-precoded version of the DMRS and/or SRS. In this way, the base station may cross-check the precoded and un-precoded RS transmissions against one another and may accordingly derive the precoding matrix.

In some examples, the UE may transmit a corresponding precoded and un-precoded RS in each sub-band, such that the base station may determine the corresponding precoding matrix per each sub-band.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-8 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   determining, by a user equipment (UE), an uplink channel estimate based at least in part on a downlink reference signal;
   receiving, by the UE, an indication of a cross-correlation matrix or a whitening matrix from a base station; and
   determining, by the UE, a precoding matrix for an uplink multiple-input multiple-output (MIMO) signal based at least in part on the uplink channel estimate and at least one of the cross-correlation matrix or the whitening matrix.

2. The method of claim 1, further comprising transmitting the uplink MIMO signal based at least in part on the precoding matrix.

3. The method of claim 1, further comprising transmitting, to the base station, information relating to the precoding matrix.

4. The method of claim 3, further comprising receiving an indication of whether the base station has overridden the precoding matrix based at least in part on transmitting the information relating to the precoding matrix.

5. The method of claim 3, wherein transmitting the information relating to the precoding matrix comprises transmitting an explicit indication of the precoding matrix on a control channel or a traffic channel.

6. The method of claim 5, wherein the explicit indication is transmitted on the control channel in association with a channel quality indicator.

7. The method of claim 5, wherein the explicit indication is transmitted on the traffic channel without precoding.

8. The method of claim 3, wherein transmitting the information relating to the precoding matrix comprises transmitting a reference signal precoded according to the precoding matrix.

9. The method of claim 8, wherein the reference signal includes at least one of:
   a demodulation reference signal,
   a sounding reference signal, or
   some combination thereof.

10. The method of claim 3, wherein transmitting the information relating to the precoding matrix comprises:
    transmitting a first reference signal precoded according to the precoding matrix; and
    transmitting a second reference signal that is not precoded, such that the precoding matrix is derivable from the first reference signal and the second reference signal.

11. A method of wireless communication, comprising:
    transmitting, by a base station, a downlink reference signal to a user equipment (UE);
    transmitting, by the base station, an indication of a cross-correlation matrix or a whitening matrix to the UE; and
    receiving, by the base station, an uplink multiple-input multiple-output (MIMO) signal from the UE, wherein the uplink MIMO signal is precoded using a precoding matrix determined based at least in part on the downlink reference signal and at least one of the cross-correlation matrix or the whitening matrix.

12. The method of claim 11, further comprising receiving, from the UE, information relating to the precoding matrix.

13. The method of claim 12, further comprising transmitting an indication of whether the base station has overridden the precoding matrix based at least in part on receiving the information relating to the precoding matrix.

14. The method of claim 12, wherein receiving the information relating to the precoding matrix comprises receiving an explicit indication of the precoding matrix on a control channel or a traffic channel.

15. The method of claim 12, wherein receiving the information relating to the precoding matrix comprises receiving a reference signal precoded according to the precoding matrix.

16. The method of claim 15, wherein the reference signal includes at least one of:
    a demodulation reference signal,
    a sounding reference signal, or
    some combination thereof.

17. The method of claim 12, wherein receiving the information relating to the precoding matrix comprises:
    receiving a first reference signal precoded according to the precoding matrix;
    receiving a second reference signal that is not precoded; and
    wherein the method further comprises deriving the precoding matrix based at least in part on the first reference signal and the second reference signal.

18. A method of wireless communication, comprising:
    receiving, by a base station, a reference signal from a user equipment (UE);
    determining, by the base station, an indication corresponding to an estimate of a cross-correlation matrix or a whitening matrix based at least in part on the reference signal; and
    determining, by the base station, a precoding matrix for an uplink multiple-input multiple-output (MIMO) signal based at least in part on the reference signal and at least one of the cross-correlation matrix or the whitening matrix.

19. The method of claim 18, further comprising transmitting, to the UE, information relating to the precoding matrix.

20. The method of claim 19, further comprising receiving the uplink MIMO signal from the UE based at least in part on transmitting the information relating to the precoding matrix, wherein the uplink MIMO signal is precoded using the precoding matrix.

21. The method of claim 19, wherein transmitting the information relating to the precoding matrix comprises transmitting an explicit indication of the precoding matrix on a control channel.

22. The method of claim 19, wherein transmitting the information relating to the precoding matrix comprises transmitting a reference signal precoded according to the precoding matrix.

23. The method of claim 22, wherein the reference signal includes at least one of:
    a demodulation reference signal,
    a channel state information-reference signal, or
    some combination thereof.

24. The method of claim 19, wherein transmitting the information relating to the precoding matrix comprises:
    transmitting a first reference signal precoded according to the precoding matrix; and
    transmitting a second reference signal that is not precoded, such that the precoding matrix is derivable from the first reference signal and the second reference signal.

25. A method of wireless communication, comprising:
    transmitting, by a user equipment (UE), a reference signal to a base station;

receiving, by the UE, information relating to a precoding matrix for an uplink multiple-input multiple-output (MIMO) signal to be transmitted by the UE,
    wherein receiving the information relating to the precoding matrix comprises receiving a downlink reference signal precoded according to the precoding matrix, and
    wherein the precoding matrix is determined based at least in part on the reference signal; and
transmitting, by the UE, the uplink MIMO signal, wherein the uplink MIMO signal is precoded using the precoding matrix.

26. The method of claim 25, wherein receiving the information relating to the precoding matrix comprises receiving an explicit indication of the precoding matrix on a control channel.

27. The method of claim 25, further comprising deriving the precoding matrix from the downlink reference signal.

28. The method of claim 25, wherein the downlink reference signal is a first reference signal, and receiving the information relating to the precoding matrix comprises receiving a second reference signal that is not precoded.

29. The method of claim 28, further comprising deriving the precoding matrix from the first reference signal and the second reference signal.

30. The method of claim 28, further comprising:
cross-checking the first reference signal and the second reference signal against one another and accordingly deriving the precoding matrix.

* * * * *